(12) United States Patent  
Song et al.

(10) Patent No.: US 9,426,340 B2  
(45) Date of Patent: Aug. 23, 2016

(54) VEHICLE CCTV CAMERA APPARATUS

(71) Applicant: IDIS CO., LTD., Daejeon-si (KR)

(72) Inventors: Jin-Kyu Song, Seoul (KR); Kyoung-Ju Jeong, Suwon-si (KR)

(73) Assignee: IDIS CO., LTD., Daejeon (KR)

( * ) Notice: Subject to any disclaimer, the term of this patent is extended or adjusted under 35 U.S.C. 154(b) by 214 days.

(21) Appl. No.: 14/287,655

(22) Filed: May 27, 2014

(65) Prior Publication Data

US 2014/0375809 A1 Dec. 25, 2014

(30) Foreign Application Priority Data

Jun. 20, 2013 (KR) .................. 10-2013-0070804

(51) Int. Cl.
| H04N 13/04 | (2006.01) |
| H04N 5/225 | (2006.01) |
| B60R 11/04 | (2006.01) |
| H04N 7/18 | (2006.01) |

(52) U.S. Cl.
CPC .............. H04N 5/2252 (2013.01); B60R 11/04 (2013.01); *H04N 7/18* (2013.01)

(58) Field of Classification Search
CPC ............ B60R 11/04; B60R 2011/0028; B60R 2011/0089; F16C 11/106; G03B 17/561; H04N 5/2252; H04N 7/18
USPC ........ 396/419, 428; 348/373, 376; 248/181.1, 248/187.1
See application file for complete search history.

(56) References Cited

U.S. PATENT DOCUMENTS

| 6,354,749 | B1 * | 3/2002 | Pfaffenberger, II .... G03B 17/00 348/143 |
| 7,217,045 | B2 * | 5/2007 | Jones ................. G08B 13/1963 348/373 |
| 7,614,804 | B2 * | 11/2009 | Kim ..................... G03B 17/561 348/373 |
| 8,558,945 | B2 * | 10/2013 | Yamauchi .............. G03B 15/00 348/373 |
| 8,891,005 | B2 * | 11/2014 | Sasaki .................... G03B 17/00 348/373 |
| 2007/0126872 | A1 * | 6/2007 | Bolotine .......... G08B 13/19619 348/151 |
| 2009/0174785 | A1 * | 7/2009 | Uchida .................... G02B 7/04 348/222.1 |
| 2010/0225802 | A1 * | 9/2010 | Yamamoto ............. F16M 11/12 348/373 |
| 2011/0033179 | A1 * | 2/2011 | Sasaki .................... G03B 17/00 396/427 |
| 2011/0064403 | A1 * | 3/2011 | Nakano .................. G03B 17/02 396/535 |
| 2013/0287385 | A1 * | 10/2013 | Andersson ........... H04N 5/2252 396/427 |

FOREIGN PATENT DOCUMENTS

| KR | 1997-0010631 B1 | 6/1997 |
| KR | 10-2003-0077219 A | 10/2003 |
| KR | 10-2009-0028950 A | 3/2009 |

* cited by examiner

*Primary Examiner* — Gims Philippe  
*Assistant Examiner* — Nathnael Aynalem  
(74) *Attorney, Agent, or Firm* — Novick, Kim & Lee, PLLC; Jae Youn Kim

(57) ABSTRACT

In a vehicle closed-circuit television (CCTV) camera apparatus mounted on a vehicle to capture images of internal and external surroundings thereof and to transmit the captured images, the camera apparatus includes: a camera module; a holding device configured to hold the camera module in a manner that enables capturing angles of the camera module to be adjusted; a housing configured to house the camera module while having an inner bottom surface coupled to the holding device; and a shock-absorbing member interposed between the holding device and the housing to absorb shock by elastically supporting the holding device and the camera module.

4 Claims, 5 Drawing Sheets

VEHICLE CCTV CAMERA APPARATUS

CROSS-REFERENCE TO RELATED APPLICATION(S)

This application claims priority from Korean Patent Application No. 10-2013-0070804, filed on Jun. 20, 2013, in the Korean Intellectual Property Office, the entire disclosure of which is incorporated herein by reference for all purposes.

BACKGROUND

1. Field

The following description generally relates to a camera apparatus of a closed-circuit television (CCTV), and more particularly to a vehicle CCTV camera apparatus that is mounted on a vehicle to capture images of internal and external surroundings of the vehicle and transmit the captured images.

2. Description of the Related Art

Closed-circuit television (CCTV) systems have been widely used in areas that require security and safety, such as residential areas, department stores, banks, exhibition centers, and the like, to manage these areas by monitoring images captured and transmitted by the CCTV systems. The CCTV system is provided with a camera to film areas and to transmit the captured images.

More recently, such CCTV systems are also used for vehicles, such as cars, trains, trucks, buses, and the like, to prevent crimes, thefts, accidents, or the like, in which camera apparatuses are installed inside of vehicles to capture internal and external surroundings thereof. As a conventional camera apparatus, Korean Laid-open Patent Publication No. 10-2009-0028950 (published on Mar. 20, 2009) discloses a camera module that is held by a holding device in a manner that enables capturing angles of the camera module to be adjusted, and the holding device is coupled to a housing by screw coupling.

Such camera apparatus may be vibrated and given a shock when a vehicle travels for a long time. As the holding device is generally made of plastic material, there occurs a problem in that the vibration and shock causes cracks and the like in the holding device. Further, coupling of the holding device with the housing may be loosened by the vibration and shock when a vehicle travels for a long time, leading to a problem in which a lens of the camera module is deviated.

SUMMARY

Disclosed is a vehicle CCTV camera apparatus that prevents cracks in a holding device, which holds a camera module, and deviation of a lens of the camera module even when the vehicle with the camera apparatus mounted thereon travels for a long time.

In one general aspect, there is provided a vehicle closed-circuit television (CCTV) camera apparatus, including: a camera module; a holding device configured to hold the camera module in a manner that enables capturing angles of the camera module to be adjusted; a housing configured to house the camera module while having an inner bottom surface coupled to the holding device; and a shock-absorbing member interposed between the holding device and the housing to absorb shock by elastically supporting the holding device and the camera module.

Figure 1:
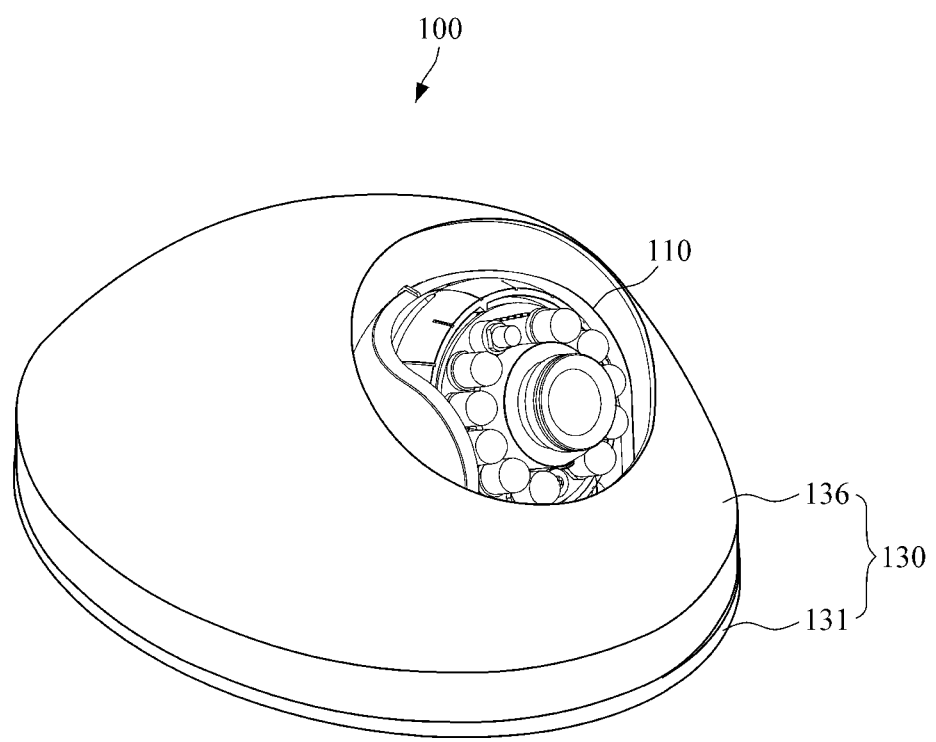
FIG. 1 is a perspective view illustrating a vehicle CCTV camera apparatus according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 2:
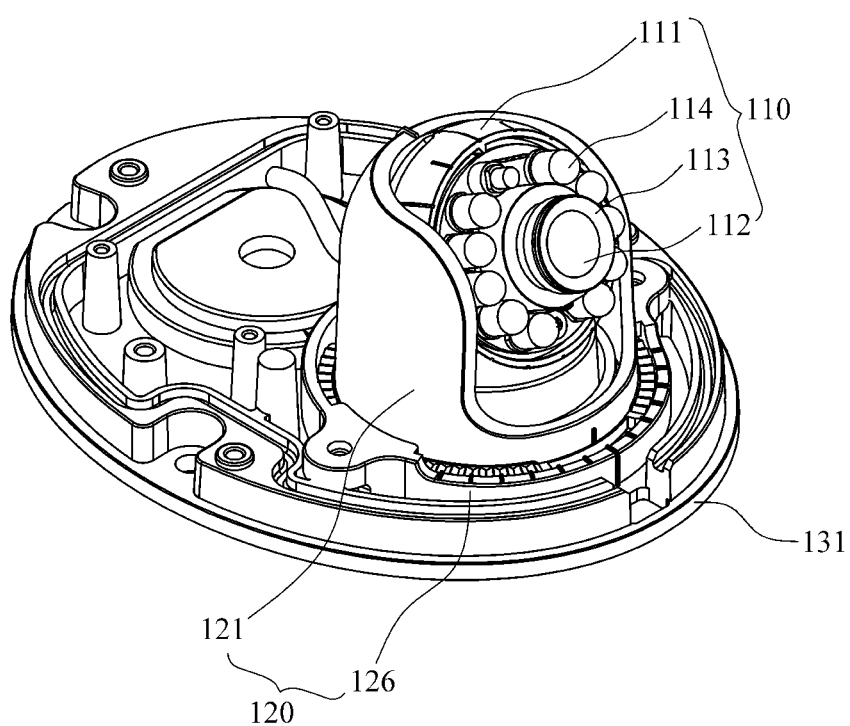
FIG. 2 is a perspective view illustrating the inside of the vehicle CCTV camera apparatus in FIG. 1.
Figure 3:
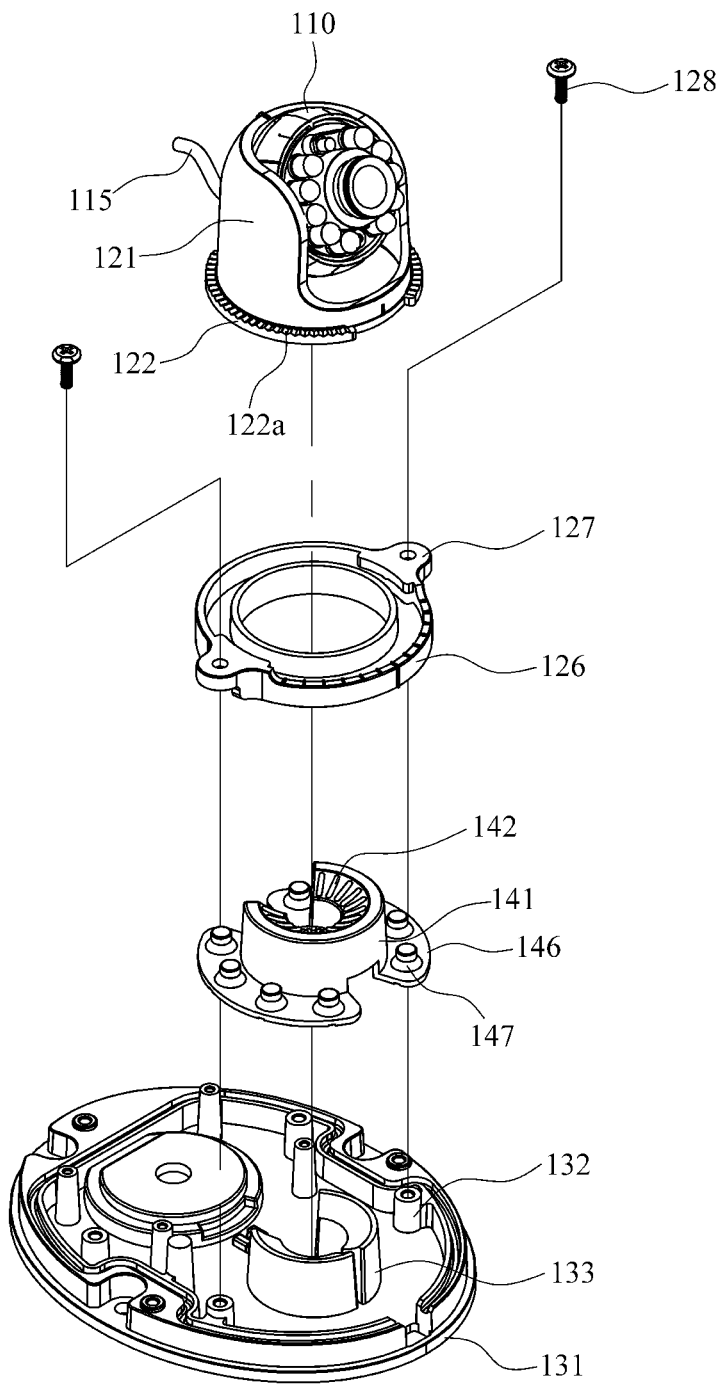
FIG. 3 is an exploded perspective view of FIG. 2.
Figure 4:
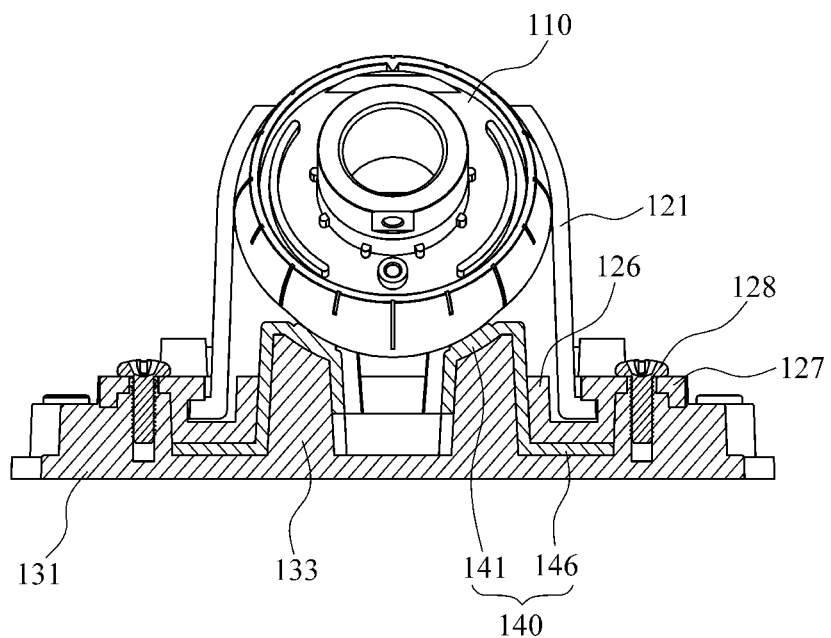
FIG. 4 is a cross-sectional view illustrating a holding device coupled to a housing with a shock-absorbing member interposed therebetween.

FIG. 1 is a perspective view illustrating a vehicle CCTV camera apparatus according to an embodiment. FIG. 2 is a perspective view illustrating the inside of the vehicle CCTV camera apparatus in FIG. 1. FIG. 3 is an exploded perspective view of FIG. 2. FIG. 4 is a cross-sectional view illustrating a holding device coupled to a housing with a shock-absorbing member interposed therebetween.

Referring to FIGS. 1 to 4, the vehicle CCTV camera apparatus 100 includes a camera module 110, a holding device 120, a housing 130, and a shock-absorbing member 140.

The camera module 110 includes a case 111 to house a circuit board (not shown) on which an image pickup device is mounted, a barrel 113 that holds a lens 112 and is housed to be exposed from the case 111, and luminous elements 114 arranged in the case 111 along the periphery of the lens 112. The luminous elements 114 are provided for lighting, and may be LEDs and the like. The circumferential surface of the case 111 is formed in a circular shape, and may be formed in a curved shape along an optical axis direction of the lens 112.

The holding device 120 holds the camera module 110 in a manner that enables capturing angles of the camera module 10 to be adjusted. For example, as the holding device 120 holds the camera module 110 in a manner that allows tilting and panning of the camera module 110, capturing angles of the camera module 110 may be adjusted properly according to an environment where the camera apparatus 100 is installed. In this case, the holding device 120 may include a tilting holder 121 and a panning holder 126. The tilting holder 121 is formed to be hollow with an upper portion and a lower portion that are open, and surrounds the circumference of the camera module 110. The tilting holder 121 holds the camera module 110 in a manner that enables the camera module 110 to be tilted. The tilting holder 121 has hinge protrusions at positions facing both sides of the camera module 110. The camera module 110 has hinge grooves on both sides thereof so that these hinge protrusions may be inserted into the hinge grooves, thereby enabling the camera module 110 to be tilted upward and downward with respect to the tilting holder 121.

Further, the tilting holder 121 has a cut-out portion corresponding to a front portion where the barrel 113 of the camera module 110 is positioned, so as to expose the front portion of the barrel 113. A circular border 122 may be formed around a lower edge of the tilting holder 121 to be protruded in a radial direction. Fixing grooves 122a are formed with a regular pitch on the surface of the circular border 122 in a circumferential direction.

The panning holder 126 is formed to be hollow with an upper portion and a lower portion that are open, and holds a lower circumference of the tilting holder 121 in a manner that allows the camera module 110 to be panned. The panning holder 126 may be formed in a ring shape. Further, the panning holder 126 may have an upper portion formed in a recess shape to house the circular border 122 of the tilting holder 121. The panning holder 126 may have pairs of protrusions, each of which is arranged on both sides of the panning holder 126. Each pair of protrusions is inserted into two corresponding fixing grooves 122a among fixing grooves 122a arranged on the circular border 122, so that the tilting holder 121 may be fixed with angles adjusted along a left and right panning direction with respect to the panning holder 126.

The housing 130 houses the camera module 110. For example, the housing 130 includes a housing base 131 and a housing cover 136. The housing cover 136 is combined to the top of the housing base 131 to house the camera module 110. The housing cover 136 may have a transparent portion that corresponds to the camera module 110.

An inner bottom surface of the housing 130, that is, a top surface of the housing base 131 is coupled to the holding device 120. A coupling portion 132 is formed on the top surface of the housing base 131. The coupling portion 132 includes bosses, each of which has a screw groove and is protruded from the top surface of the housing base 131. The panning holder 126 includes coupling pieces 127 that extend to correspond to each of the bosses. Each of the coupling pieces 127 may have a through hole to enable a screw 128 to pass therethrough. The screw 128 passes through the through hole of the coupling piece 127 to be coupled to a screw groove of a boss, such that the panning holder 126 may be fixed to the housing base 131.

The shock-absorbing member 140 is interposed between the holding device 120 and the housing 130 to absorb shock by elastically supporting the holding device 120 and the housing 130. The shock-absorbing member 140 may be inserted between the panning holder 126 and the housing base 131. The shock-absorbing member 140 may be made of an elastic material such as rubber, silicon, or the like. In a case where the camera apparatus 100 is vibrated and given a shock while mounted on a vehicle travelling for a long time, the shock-absorbing member 140 may absorb the vibration and shock by being positioned between the panning holder 126 and the housing base 131. Accordingly, even when the panning holder 126 is made of a material with the same rigidity as a plastic material and the like, which is capable of stably holding the tilting holder 121, problems, such as cracks and the like in the panning holder 126, may be prevented.

Further, even when coupling of the panning holder 126 and the housing base 131 is loosened by the vibration and shock in a vehicle while travelling for a long time, the shock-absorbing member 140 elastically pushes the panning holder 126 from the housing base 131, such that the panning holder 126 and the housing base 131 may be tightly coupled. Moreover, as the shock-absorbing member 140 elastically supports the camera module 110, deviation of the lens 112 of the camera module 110 may be prevented.

The housing 130 includes a protruded supporter 133. The protruded supporter 133 is protruded by passing through the holding device 120 from the inner bottom surface of the housing 130 to surround the lower portion of the camera module 110. For example, a pair of the protruded supporters 133 may be formed to be bilaterally symmetrical and have a recess middle portion. The protruded supporter 133 may have a cut-out portion that corresponds to the rear side of the camera module 110. Accordingly, in a case where a cable 115 is connected through the rear side of the camera module 110, the cable 115 may be easily movable through the cut-out rear portion of the protruded supporter 133, and as a result, the camera module 110 may be readily tilted and/or panned. Further, the protruded supporter 133 may be formed in a concavely curved shape along a circumferential direction to surround a curved lower portion of the camera module 110.

The shock-absorbing member 140 includes a shock-absorbing body 141 and a shock-absorbing flange 146. The shock-absorbing body 141 is formed to surround a top surface and a circumferential surface of the protruded supporter 133. The shock-absorbing body 141 has a specific thickness to surround the top surface and the circumferential surface of the protruded supporter 133. The shock-absorbing body 141 may have a cut-out portion that corresponds to the cut-out rear portion of the protruded supporter 133.

The shock-absorbing body 141 may include protrusions 142, each of which is protruded from the top surface of the shock-absorbing body 141 to be radially arranged. Each protrusion 142 may be formed to be radially extended. The protrusions 142 are formed to be elastically transformed, with the lower portion of the camera module 110 sitting on the top surface of the shock-absorbing body 141. Accordingly, the protrusions 142 may further enhance elasticity provided for the camera module 110 by the shock-absorbing body 141, thereby enabling the camera module 110 to be stably held in a long vehicle trip.

Figure 5:
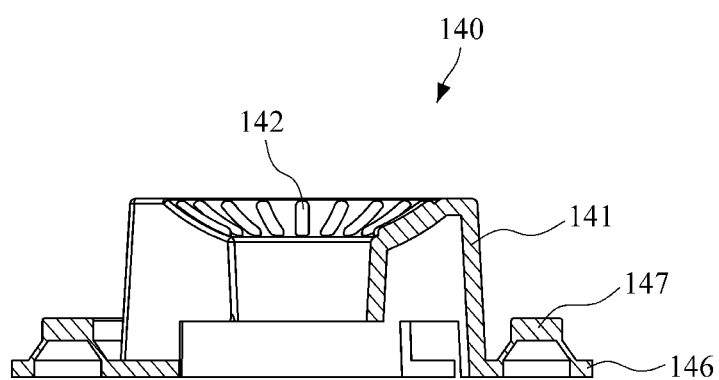
FIG. 5 is a cross-sectional view of the shock-absorbing member in FIG. 3.

The shock-absorbing flange 146 is protruded from a lower circumference of the shock-absorbing body 141 to be contacted with the inner bottom surface of the housing 130, to support a lower surface of the edge of the holding device 120. The shock-absorbing flange 146 may be formed in a circular band shape to support the lower surface of the panning holder 126. The shock-absorbing flange 146 may include a plurality of embossing portions 147 that are protruded from the top surface thereof. As illustrated in FIG. 5, the embossing portions 147 have a concave shape as viewed from the lower surface of the shock-absorbing flange 146, and have a convex shape as viewed from the upper surface of the shock-absorbing flange 146. Further, the embossing portions 147 may have a truncated cone shape, or a hemispherical shape, but the shape of the embossing portions 147 is not limited thereto.

Figure 6:
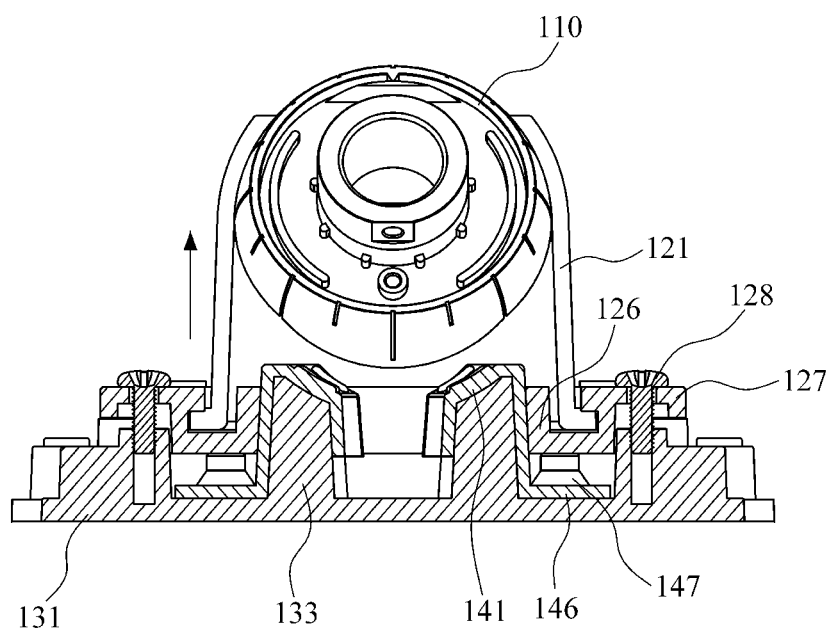
FIG. 6 is a diagram to explain an example of an action performed by the embossing portions of the shock-absorbing member in FIG. 4.

The embossing portions 147 are elastically transformed while being pressured when the panning holder 126 is coupled to the housing base 131, and the embossing portions 147 is restored to an original state when the panning holder 126 is detached from the housing base 131. While being elastically transformed, the embossing portions 147 apply elasticity to the panning holder 126. Accordingly, as illustrated in FIG. 6, when the screw 128 is unscrewed to adjust angles of the camera module 110 in a tilting direction and/or a panning direction, the embossing portions 147 elastically push the panning holder 126, and accordingly, the camera module 110 may be arranged in a position that enables the camera module 110 to avoid interference with the shock-absorbing body 141. As a result, angles of the camera module 110 may be easily adjusted. Each of the embossing portions

147 is formed to be tapered toward the top thereof, allowing them to be easily transformed and restored.

In the present embodiments, by using a shock-absorbing member, it is possible to prevent problems, such as cracks in a holding device that holds a camera module or deviation of a lens of the camera module, even in a case where a camera apparatus is vibrated and given a shock when being mounted on a vehicle travelling for a long time.

Further, in the present embodiment, when the holding device is decoupled from the housing, a camera module is disposed in a position that enables the camera module to avoid interference with a shock-absorbing body by using embossing portions of the shock-absorbing member, such that angles of the camera module may be easily adjusted.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims. Further, the above-described examples are for illustrative explanation of the present invention, and thus, the present invention is not limited thereto.

What is claimed is:

1. A vehicle closed-circuit television (CCTV) camera apparatus, comprising:
   a camera module;
   a holding device configured to hold the camera module in a manner that enables capturing angles of the camera module to be adjusted;
   a housing configured to house the camera module while having an inner bottom surface coupled to the holding device; and
   a shock-absorbing member interposed between the holding device and the housing to absorb shock by elastically supporting the holding device and the camera module,
   wherein:
   the housing comprises a protruded supporter that is protruded by passing through the holding device from the inner bottom surface of the housing to surround a lower portion of the camera module; and
   the shock-absorbing member comprises:
   a shock-absorbing body that surrounds a top surface and a circumferential surface of the protruded supporter; and
   a shock-absorbing flange that is protruded from a lower circumference of the shock-absorbing body to be contacted with the inner bottom surface of the housing to support a lower surface of an edge of the holding device.

2. The apparatus of claim 1, wherein the shock-absorbing flange comprises a plurality of embossing portions that are protruded from a top surface of the shock-absorbing flange.

3. The apparatus of claim 1, wherein the shock-absorbing body comprises a plurality of protrusions, each of which is protruded from a top surface of the shock-absorbing body to be radially arranged.

4. The apparatus of claim 1, wherein the holding device comprises:
   a tilting holder formed to be hollow with an upper portion and a lower portion that are open, and configured to surround a circumference of the camera module and to hold the camera module in a manner that enables the camera module to be tilted; and
   a panning holder formed to be hollow with an upper portion and a lower portion that are open, and configured to hold a lower circumference of the tilting holder in a manner that enables the camera module to be panned.

\* \* \* \* \*